(12) United States Patent
Svedin

(10) Patent No.: US 10,244,686 B1
(45) Date of Patent: Apr. 2, 2019

(54) LANDSCAPING TOOL FOR EDGING AND GRADING

(71) Applicant: Wilson T. Svedin, Riverton, UT (US)

(72) Inventor: Wilson T. Svedin, Riverton, UT (US)

( * ) Notice: Subject to any disclaimer, the term of this patent is extended or adjusted under 35 U.S.C. 154(b) by 0 days.

(21) Appl. No.: 15/701,142

(22) Filed: Sep. 11, 2017

(51) Int. Cl.
*A01G 3/06* (2006.01)

(52) U.S. Cl.
CPC ..................... *A01G 3/06* (2013.01)

(58) Field of Classification Search
CPC ....................................................... A01G 3/06
USPC ........................................................... 172/13
See application file for complete search history.

(56) References Cited

U.S. PATENT DOCUMENTS

| | | | | |
|---|---|---|---|---|
| 902,141 | A | * | 10/1908 | Finch ................. A01G 3/06 172/13 |
| 903,085 | A | * | 11/1908 | Heather ............... A01G 3/06 172/13 |
| 925,671 | A | * | 6/1909 | Waters ................ A01G 3/06 172/13 |
| 1,082,570 | A | | 12/1913 | Underwood |
| 1,331,750 | A | | 2/1920 | Fulton |
| 1,503,143 | A | | 7/1924 | Upton |
| 1,699,071 | A | | 1/1929 | Kinney |
| 1,876,979 | A | | 9/1932 | Larson |
| 2,133,208 | A | | 10/1938 | Nellis |
| 2,184,034 | A | | 12/1939 | Broward, Sr. |
| 2,288,374 | A | | 6/1942 | Steele |
| 2,753,785 | A | | 7/1956 | Zenk |
| 3,065,801 | A | | 11/1962 | Wood |
| 4,224,765 | A | | 9/1980 | Song |
| 4,351,395 | A | | 9/1982 | Lilley |
| 4,546,407 | A | | 10/1985 | Benenati |
| 6,918,207 | B2 | | 7/2005 | Dai |
| 8,066,080 | B1 | * | 11/2011 | Hanson .................. A01B 1/02 172/13 |
| 2003/0159350 | A1 | | 8/2003 | Lo |
| 2008/0236041 | A1 | | 10/2008 | Carpenter |

* cited by examiner

*Primary Examiner* — Tara Mayo-Pinnock
(74) *Attorney, Agent, or Firm* — Duren IP; Todd E. Zenger

(57) ABSTRACT

The present invention is directed to a rigid, blade-shaped landscaping tool for defining and maintaining a well-defined boundary between a garden or soil bed and an adjacent natural or man-made ground surface. The tool generally comprising a vertical cutter, a horizontal cultivator, a grader flange and a handle mount disposed on the top edge of the blade. In particular, the landscaping function of the tool can be accomplished by physically drawing the tool along the adjacent natural or man-made ground surface whereby the vertical cutter and an associated horizontal cultivator sever plant growth and/or dislodge soil which are then physically graded away from the plane of the vertical cutter and away from the adjacent ground surface toward the soil bed to create the desired, well-defined edge and/or boundary between the soil bed and the adjacent ground surface.

16 Claims, 2 Drawing Sheets

LANDSCAPING TOOL FOR EDGING AND GRADING

BACKGROUND OF THE INVENTION

1. Field of the Invention

The present invention relates to rigid, blade-shaped landscaping tool for defining and maintaining an edge and boundary between a garden or soil bed and an adjacent natural or man-made ground surface. The tool generally comprising a substantially vertical cutter, a substantially horizontal cultivator, a grader and a handle mount disposed on the top edge of the blade. In particular, the landscaping function of the tool can be accomplished by physically drawing the tool along the adjacent natural or man-made ground surface whereby the vertical cutter and an associated horizontal cultivator sever plant growth and/or dislodge soil which are then physically graded away from the plane of the vertical cutter and away from the adjacent ground surface toward the soil bed to create the desired, well-defined edge and/or boundary between the soil bed and the adjacent ground surface.

2. Background and Related Art

Different types of lawn and other edging tools are disclosed in the prior art including U.S. Pat. Nos. 1,082,570, 1,331,750, 1,503,143, 1,699,071, 1,876,979, 2,184,034, 2,133,208, 2,288,374, 2,753,785, 3,065,801, 4,351,395 and 4,564,702. For example, U.S. Pat. No. 1,082,570 issued Dec. 30, 1913 discloses a channel-shaped cutting member or blade having one side 13 straight and vertical and the other side 14 concave.

U.S. Pat. No. 1,331,750 discloses an inclined, U-shaped shovel 6 having a corresponding U-shaped cutting edge 10 having two vertical cutters connected by a horizontal cutter. The depth of cutting edge 10 and the resulting trough is limited by horizontal guide flange 11 adapted to be arranged flatly upon the sidewalk. In use, curved side 7 discharges dirt onto the sidewalk at the height of horizontal guide 11 providing a U-shaped trough.

U.S. Pat. No. 1,503,143 discloses a lawn edger for channeling the edges adjacent the walk or for trimming the edges of flower beds. In use the edger cuts a channel having opposing sides. Opposing sides of the channel are not cut at the same time; serrated cutting edge 2 of member E makes the initial cut of one side of the channel in advance of serrated cutting edge 2 of member B which trails behind to make the cut for the opposite side of the channel.

U.S. Pat. No. 1,699,071 discloses a lawn trimmer guided along the edge of a walk such as concrete to trim the lawn away from the walk and leave a clean ditch and depositing the removed material upon the lawn. Cutting edges 11, 12 and 13 cut ditch 18. The trimmer also has an inclined back 9.

U.S. Pat. No. 1,876,979 discloses an edge trimmer to leave a trough of uniform width and depth. The trough is cut by the front knife edge of the upwardly and outwardly projecting cutter portion 12 and the lower inner knife edge of vertical check plate 11. In use the depth of the trough is limited because foot portion 20 rides upon the top of the sidewalk 22 and earth and vegetation are directed on to the sidewalk by cutter portion 12 which extends toe the rear and is curved inwardly at 13.

U.S. Pat. No. 2,133,208 discloses lawn tool for cutting or trimming the edges of lawns along or about walks, beds, shrubbery, trees, etc. The tool simultaneously removes and deposits the material cut laterally of the edge. Downwardly and forwardly inclined blade portion 10 is spaced rearward of angular-shaped, substantially vertical blade 3.

U.S. Pat. No. 2,184,034 discloses a lawn trimming tool. The tool comprises a blade 5 the lower section of which is bent outwardly relative to the upper section to dispose the handle 9 in an upwardly and outwardly inclined position when the faces of the lower section are disposed in a vertical position in use. A vertically extending edge 11' is drawn over the surface of the lawn to effect trimming.

U.S. Pat. No. 2,288,374 discloses a lawn edging appliance having a blade bent at right angles forming a horizontal blade portion 16 and an upright blade portion 17 such that the horizontal blade portion is wider in the direction of use than the upright portion 17. The outer longer edge 24 of the horizontal blade portion 16 is left blunt because during use of the appliance is guided by keeping outer blunt edge 24 of blade 16 in engagement with the side of the walk or other border structure 32. The blade is embedded in the soil to the depth represented by the length of upright blade 17 between block 10 and horizontal blade 16 because block 10 rides over the tope surface of the lawn or soil. United States Patent No.

U.S. Pat. No. 2,753,785 discloses a lawn edge trimmer for trimming the edge of a lawn along the side of a curb or sidewalk. Trimmer has an arcuate cutting member 23 forming a J-shaped cutting member with projecting point 27 adjacent the sidewalk. The bottom of the cutting member at its rearward end 28 slopes upwardly and in use, scoops the cut sod and dirt from the space immediately adjacent the sidewalk and deposits this dirt on the sidewalk. The depth of the cutting action is determined by L-shaped guide member 10 whose horizontal leg 12 engages the top surface of the lawn 29.

U.S. Pat. No. 3,065,801 discloses a sidewalk edger. The body 2 of the edger is formed at one side with a flat, horizontal scraper portion 4, at the central portion with a longitudinally extending, horizontally disposed depressed portion 6 and at the other side with upstanding cutter portion 8. Horizontal scraper portion 4 is placed against the upper surface of the sidewalk with the depressed portion 6 serving as a guide against the side edge of the sidewalk. As the edger is pushed forward, cutting edge 14 of scraper portion 4 slides along the upper surface of the sidewalk and cuts the grass and dirt therefrom. At the same time, a shallow groove is cut in the turf along the edge of the sidewalk by the cutting edge 16 of depressed portion 6 while any grass, turf or other obstruction is severed by cutting edge 18 of upstanding cutter portion 8. The upstanding portion 8 is inclined outwardly from depressed portion 6 and extends upwardly to a point substantially above horizontal scraper portion 4.

U.S. Pat. No. 4,351,395 discloses a lawn edger and trimmer. The edger 1 includes a vertical cutting edge 4 and an obliquely angled groove maker 7. The groove maker 7 retains the vertical cutting edge 4 a distance from the sidewalk. As cuttings are produced by the action of the cutting edge 4 and groove maker 7, they fall upon sidewalk 13.

U.S. Pat. No. 4,564,072 discloses a multi-purpose garden tool. The tool head comprises a blade portion 4 and a soil-deflecting portion 5. The blade portion 4 has a bottom working edge 6, and a leading working edge 7 inclined upwardly from the bottom edge 6 at an angle. The working edges 6 and 7 together define a pointed end 8. The soil-deflecting portion 5 of the tool head 2 curves round from the blade portion 4 on one side only. The curved soil-deflecting portion 5 is sufficiently far round to form a scoop-like member with a shape similar to that of an inverted cone divided into two along it axis. The upper end of the soil-deflecting portion provides a rounded end 9 to the tool head 2.

These designs do not disclose the combined structure and function of the present invention. Accordingly, it would be an improvement in the art to provide an apparatus which simultaneously defines or maintains a border between and grades the soil between a planting bed and adjacent lawn or other surface such as a sidewalk.

SUMMARY OF THE INVENTION

The present invention relates to apparatuses for both defining or maintaining a border between a planting or garden bed and adjacent lawn or other surface such as a sidewalk. The same device also grades the soil between the planting and adjacent lawn or other surface. The apparatus of the present accomplishes both at the time during use.

In particular, the present invention is directed to substantially vertical blade member with appendages capable of simultaneously providing three landscaping functions, namely, (i) a vertical cut of the lawn, (ii) a horizontal cut or cultivation of soil at the base of and contiguous with the vertical cut, the horizontal cut in the direction of the garden bed, and (iii) grading of the cut or cultivated soil from the juncture of the vertical and horizontal cuts in the direction of the garden bed.

The present invention for landscaping tool comprises a low profile, substantially vertical blade comprising a first end, a second end, a top edge, a bottom edge, a front or garden side and a back or lawn/structure side. The blade comprises a cutting edge at the first end and a grader at the second end. The grader is defined by forming the second end of the blade such that the second end of the blade departs from the plane of the rest of the blade in an arcing manner toward the garden side of the blade. If desired, the blade can be oriented a desired number of degrees from vertical.

The top edge of the blade comprises a means for receiving a handle.

The bottom edge of the blade hosts a low profile, substantially horizontal cultivator disposed along the bottom edge of the blade at substantially a right angle to the blade. The cultivator comprises a leading edge and a boundary edge, the cultivator having a proximal end attached to the blade and a distal end extending away from the blade on the garden side of the blade. The cultivator is angled in the direction of the grader.

The low-profile nature of the present invention permits the user to pull the tool along the border to the soil bed simultaneously making a vertical cut of adjacent lawn, making a horizontal cut or cultivation of soil at the base of the vertical cut, the horizontal cut in the direction of the garden bed, and grading of the cut or cultivated soil from the apex of the vertical and horizontal cuts in the direction of the garden bed.

These and other features and advantages of the present invention will be set forth or will become more fully apparent in the description that follows and in the appended claims. The features and advantages may be realized and obtained by structure outlined methods and particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to substantially low-profile landscaping tool used to create a desired border between a soil bed and an adjacent surface. The adjacent surface may be a lawn, other walking path, sidewalk or curb. The new landscaping tool permits the user to simultaneously make a vertical cut of the lawn, a horizontal cut or cultivation of soil at the base of and contiguous with the vertical cut, the horizontal cut made in the soil in the direction of the garden bed, and grading of the cut or cultivated soil from the apex of the vertical and horizontal cuts in the direction of the garden bed. In this way a well defined border can be created and/or maintained between the chosen soil bed and adjacent surface.

Figure 1:
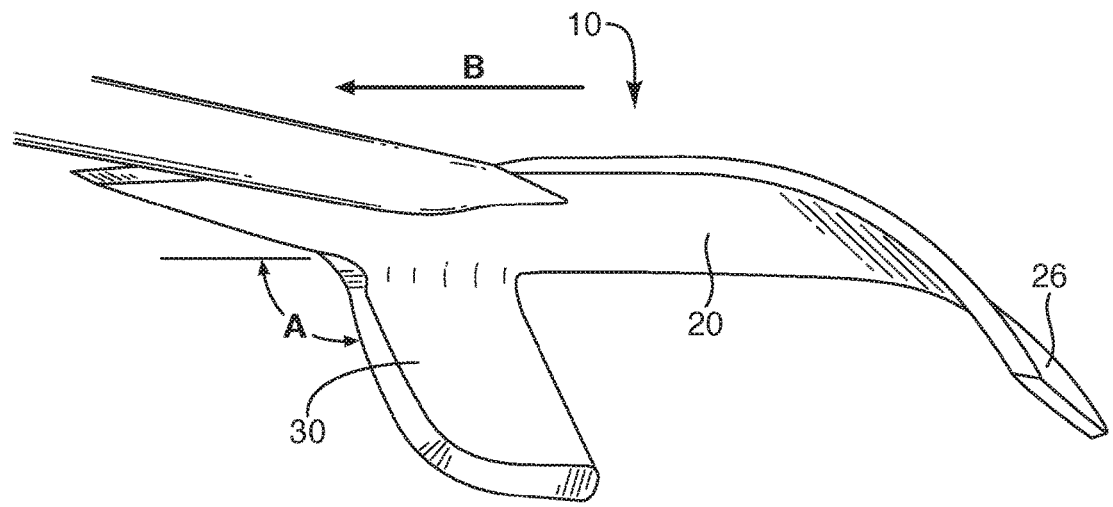
FIG. 1 illustrates a top perspective view of one embodiment of the landscaping tool of the present invention.

FIG. 1 shows a top perspective view of one embodiment of the landscaping tool 10 of the present invention. Tool 10 comprises a low-profile, substantially vertical blade 20 and an appended low-profile, substantially horizontal cultivator 30.

Figure 2:
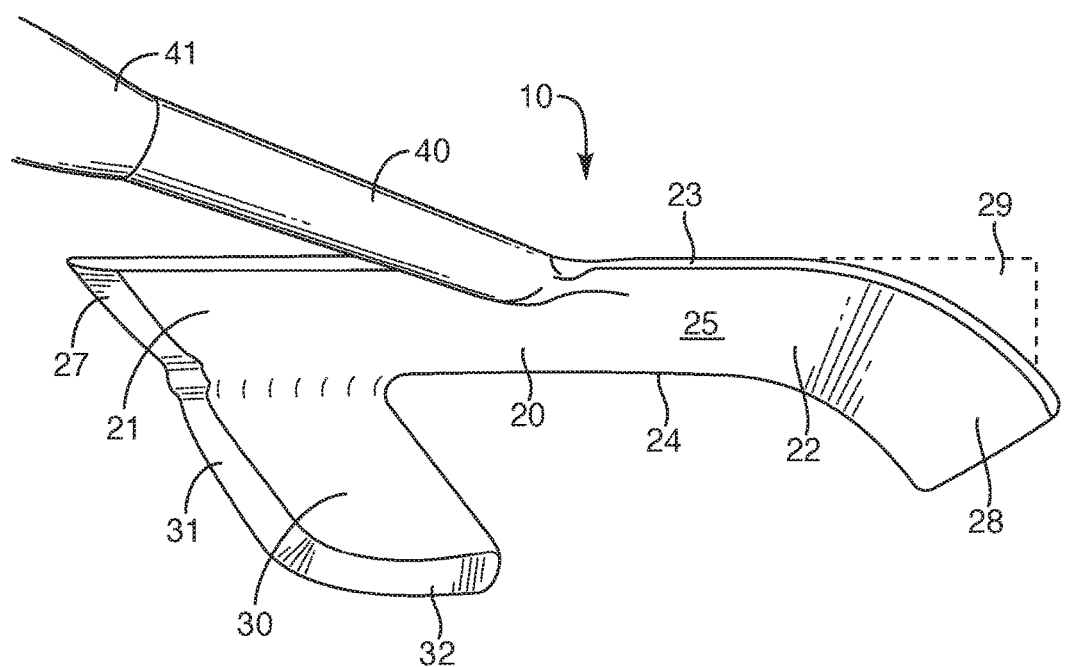
FIG. 2 illustrates a side perspective view of one embodiment of the landscaping tool of the present invention.

As shown in FIGS. 1 and 2, the blade 20 comprises a first end 21, a second end 22, a top edge 23, a bottom edge 24, a front or garden side 25 and a back or lawn/structure side 26. The blade comprises a substantially vertical cutting edge 27 at the first end 21 and a grader 28 at the second end 22. If desired, the blade can be oriented a desired number of degrees from vertical.

Figure 3:
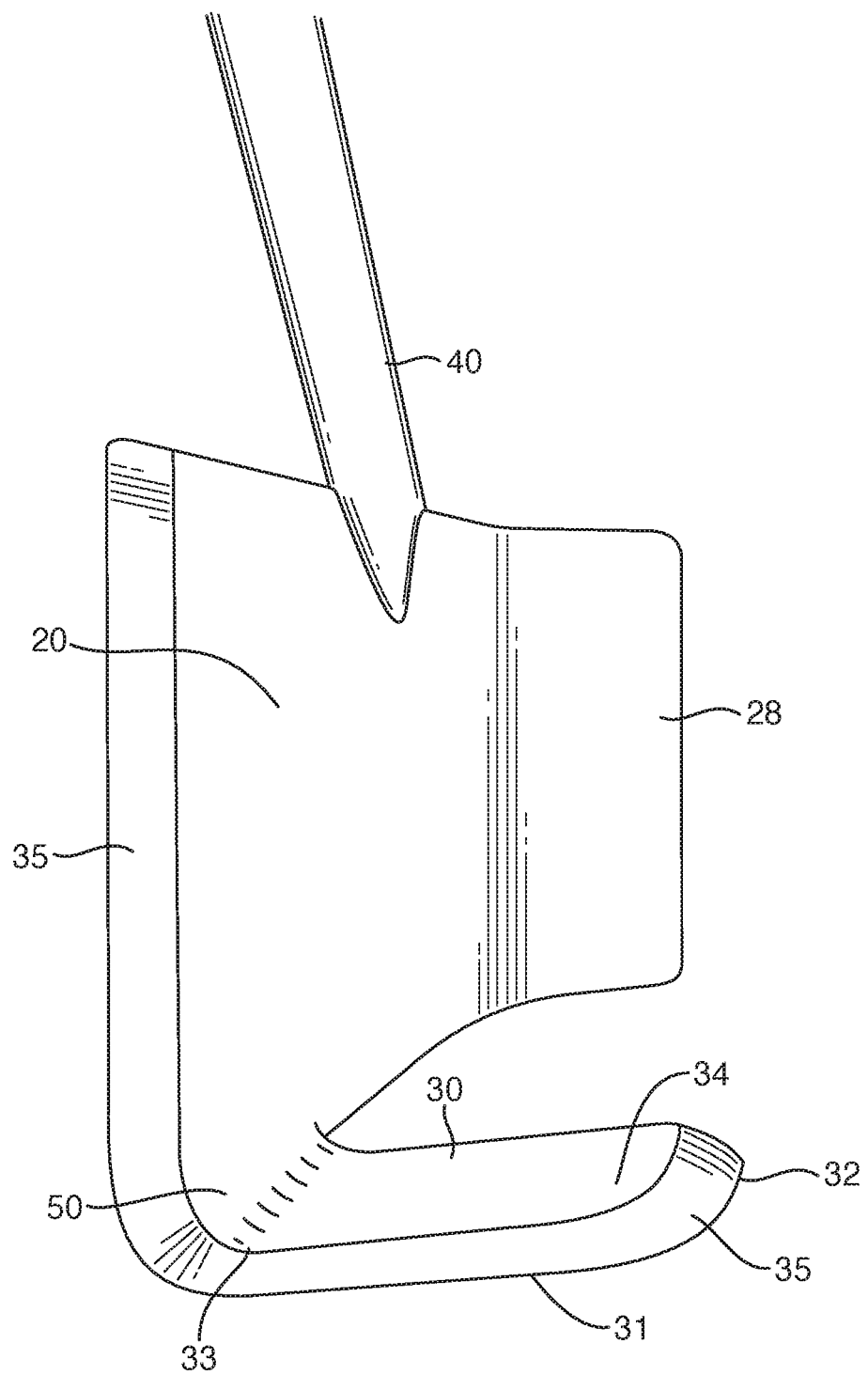
FIG. 3 illustrates perspective view from the first end of the blade toward the second end of the blade of one embodiment of the landscaping tool of the present invention.

As shown in FIGS. 1-3, grader 28 is defined by forming the second end 22 of blade 20 such that second end 22 of blade 20 departs from the plane 29 (shown in dotted lines) of the rest of blade 20 in an arcing manner toward the garden side 25 of the blade. Grader 28 is disposed vertically so as to direct cultivated soil toward the soil bed away from the adjacent surface. The substantially vertical orientation of cultivator 28 avoids soil being lifted up and/or over cultivator 28 in the direction of the adjacent surface thereby depositing cultivated soil and any other cuttings from cutting edge 27, if any, to the soil bed not on the adjacent lawn, walkway, curb or sidewalk.

The top edge 23 of the blade comprises a means 40 for receiving a handle 41. Means for receiving a handle 41 is any conventional structure known by those of skill in the art designed to receive a handle such as a pole handle common to landscaping tools which are grasped by the user to direct the use of the tool.

The bottom edge 24 of blade 20 hosts a low profile, substantially horizontal cultivator 30 disposed along the bottom edge of the blade at substantially a right angle to blade 20 as shown in FIG. 3. The cultivator comprises a leading edge 31 and a boundary edge 32, the cultivator having a proximal end 33 attached to the blade and a distal end 34 extending away from the blade on the garden side of blade 20 in the direction of the soil bed. In the preferred embodiment, cultivator 30 is angled in the direction of grader 28 as shown by angle A in FIG. 1, angle A being greater than ninety degrees. An angled cultivator 30 and leading edge 31 along leading edge 31 and boundary edge 32 permit cultivator 30 to slice through the soil.

In a preferred embodiment, cultivator 30 is disposed along bottom edge 24 of blade 20 at a position adjacent and contiguous to first end 21 to provide a juncture 50 where cutting edge 27 of blade 20 joins in a contiguous manner with leading edge 31 of cultivator 30. This contiguous juncture provides a number of advantages. The contiguous juncture creates a well-defined boundary between the soil bed and the adjacent surface at juncture 50. A contiguous juncture and the angled nature of leading edge 31 of cultivator 30 lessens the amount of exertion of the user.

Cutting edge 27, leading edge 31 and boundary edge 32 are preferably configured with a beveled or ramped surface 35 to facilitate cutting and cultivating and to minimize drag and friction as tool 10 trims adjacent lawn and is drawn through soil. Surface 35 also promotes the retention of cultivator 30 in the soil as the user pulls tool 10 through soil. The substantially horizontal orientation of cultivator 30 reduces the drag and friction between tool 10 and the soil when tool 10 is drawn through soil.

In use, tool 10 is placed with end 21 of blade 20 against a surface such as a lawn edge, walkway boundary or vertical side of a sidewalk or curb. The user draws or pulls tool 10 in the direction shown by arrow B in FIG. 1 along the adjacent surface. Tool 10 is used by physically drawing the tool along the adjacent natural or man-made ground surface whereby the vertical cutter and an associated horizontal cultivator sever plant growth and/or dislodge soil which are then physically graded away from the plane of the vertical cutter and away from the adjacent ground surface toward the soil bed to create the desired, well-defined edge and/or boundary between the soil bed and the adjacent ground surface.

For example, when maintaining a lawn edge, drawing tool 10 in the direction of arrow B performs a number of landscaping operations at the same time. The user manually directs cutting edge 27 along or into the lawn edge thereby maintaining or trimming the lawn edge as desired. At the same time the user manually positions cultivator 30 at the desired depth in the soil and by pulling leading edge 31 and boundary edge 32 through the soil at the desired depth soil is cultivated. At the same time, a well-defined boundary is formed between the soil bed and the lawn by juncture 50. At the same time the cultivated soil is graded back into the soil bed by grader 28. In this manner, the user is able to selectively define and/or maintain the desired lawn edge and boundary with minimal effort due to the low-profile nature of landscaping tool 10. The same landscaping technique can be used between a sidewalk and a garden bed where end 21 of blade 20 rests against the vertical side of the sidewalk.

Thus, as discussed herein, the embodiments of the present invention embrace FIGS. 1-3 and equivalents thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A landscaping tool comprising:
   a substantially vertical blade, the blade comprising a first end, a second end, a top edge, a bottom edge, a front side and a back side;
   a substantially vertical cutting edge disposed on the first end of the blade;
   a grader disposed at the second end of the blade, the grader arching away from the blade in the direction of the front side of the blade;
   a substantially horizontal cultivator disposed along the bottom edge of the blade at substantially a right angle to the blade, the cultivator comprising a leading edge and a boundary edge, the cultivator being angled in the direction of grader such that the angle between the substantially vertical cutting edge and the leading edge of the cultivator is greater than ninety degrees;
   a juncture formed at the union of the cutting edge of the blade and the leading edge of the cultivator.

2. The apparatus of claim 1 further comprising means disposed on the top edge of the blade for receiving a user handle.

3. The apparatus of claim 1 wherein the cultivator is angled toward the grader.

4. The apparatus of claim 1 wherein the cutting edge of the blade is substantially vertical.

5. The apparatus of claim 1 wherein the grader is substantially vertical.

6. The apparatus of claim 1 wherein the cutting edge of the blade is beveled.

7. The apparatus of claim 1 wherein the leading edge of the cultivator is beveled.

8. The apparatus of claim 1 wherein the juncture forms a contiguous edge comprising the cutting edge of the blade and the leading edge of the cultivator.

9. The apparatus of claim 8 wherein the contiguous edge forms a continuous edge comprising the cutting edge of the blade and leading edge of the cultivator.

10. A landscaping tool comprising:
    a L-shaped cutting member comprising a substantially vertical cutting edge and a substantially horizontal cutting edge appending from the vertical cutting edge in a first direction, the substantially horizontal cutting edge comprising a leading edge, the horizontal cutting edge being angled in the direction of grader such that the angle between the substantially vertical cutting edge and the leading edge of the substantially horizontal cutting is greater than ninety degrees;
    a grader attached to the L-shaped cutting member arching away from the L-shaped cutting member in the first direction; and
    a juncture formed at the union of the vertical cutting edge and the horizontal cutting edge.

11. The apparatus of claim 10 further comprising means disposed on the L-shaped cutting member for receiving a user handle.

12. The apparatus of claim 10 wherein the horizontal cutting edge is angled toward the grader.

13. The apparatus of claim 10 wherein the grader is substantially vertical.

14. The apparatus of claim 10 wherein the vertical cutting edge is beveled.

15. The apparatus of claim 10 wherein the horizontal cutting edge is beveled.

16. The apparatus of claim 10 wherein the juncture forms a continuous edge comprising the vertical cutting edge and the horizontal cutting edge.

\* \* \* \* \*